United States Patent
Jufuku et al.

[11] Patent Number: 5,261,863
[45] Date of Patent: Nov. 16, 1993

[54] TOROIDAL TYPE CONTINUOUSLY VARIABLE SPEED TRANSMISSION MECHANISM

[75] Inventors: Yasunobu Jufuku, Gotenba; Yuudai Tatara, Susono; Hiroyuki Ito, Fujisawa, all of Japan

[73] Assignees: Toyota Jidosha Kabushiki Kaisha, Aichi; NSK Ltd., Tokyo, both of Japan

[21] Appl. No.: 918,691

[22] Filed: Jul. 27, 1992

[30] Foreign Application Priority Data

Jan. 8, 1992 [JP] Japan .............................. 4-000224[U]
Jan. 8, 1992 [JP] Japan .............................. 4-001524

[51] Int. Cl.⁵ ............................................. F16H 15/38
[52] U.S. Cl. ........................................ 476/40; 476/45; 476/46
[58] Field of Search .................. 476/40, 41, 42, 43, 476/44, 45, 46

[56] References Cited

U.S. PATENT DOCUMENTS 4,960,004 10/1990 Hibi et al. .............................. 74/200

FOREIGN PATENT DOCUMENTS

56-17447 7/1979 Japan .
63-30656 2/1988 Japan .
1-210653 8/1989 Japan .
1-238756 9/1989 Japan .
1-275950 11/1989 Japan .

*Primary Examiner*—Allan D. Herrmann
*Attorney, Agent, or Firm*—Shapiro and Shapiro

[57] ABSTRACT

A continuously variable speed transmission mechanism comprises a tubular input shaft connected at an end to an input unit, an output shaft positioned coaxially with the input shaft, connected at an end to an output unit and extending at the other end into the hollow part of the input shaft, an input disk rotatably mounted on the output shaft and adapted to rotate by the driving force transmitted from the input shaft, an output disk fixed on the output shaft and adapted to rotate by the driving force transmitted from the input disk through power rollers, and a thrust bearing positioned between the other end of the output shaft and a corresponding part of the input shaft thereby enabling mutual rotation of the shafts. Wherein the reactive force applied to the input disk at the transmission of driving force is received by the thrust bearing through the input shaft, while the reactive force applied to the output disk is also received by the thrust bearing through the output shaft.

3 Claims, 7 Drawing Sheets

TOROIDAL TYPE CONTINUOUSLY VARIABLE SPEED TRANSMISSION MECHANISM

BACKGROUND OF THE INVENTION

1. Field of the Invention

The present invention relates to a continuously variable speed transmission mechanism or constant velocity joint (CVJ), and more particularly an improved continuously variable speed transmission mechanism in which the input shaft and the output shaft are positioned coaxially and reactive forces of input and output disks are received by a common thrust bearing.

2. Related Background Art

In a toroidal type continuously variable speed transmission mechanism, power rollers are positioned between an input disk and an output disk and are moved in a plane perpendicular to the axis of said disks, in order to vary the effective radii of contact points of said input and output disks with the power rollers, whereby the input power can be transmitted with continuous variation of speed to the output side. At the power transmission, the input disk is pressed to the power rollers, and the input and output disks receive reactive forces from the power rollers. How to receive said reactive forces is an issue even related to the entire structure of the continuously variable speed transmission mechanism.

Figure 6:
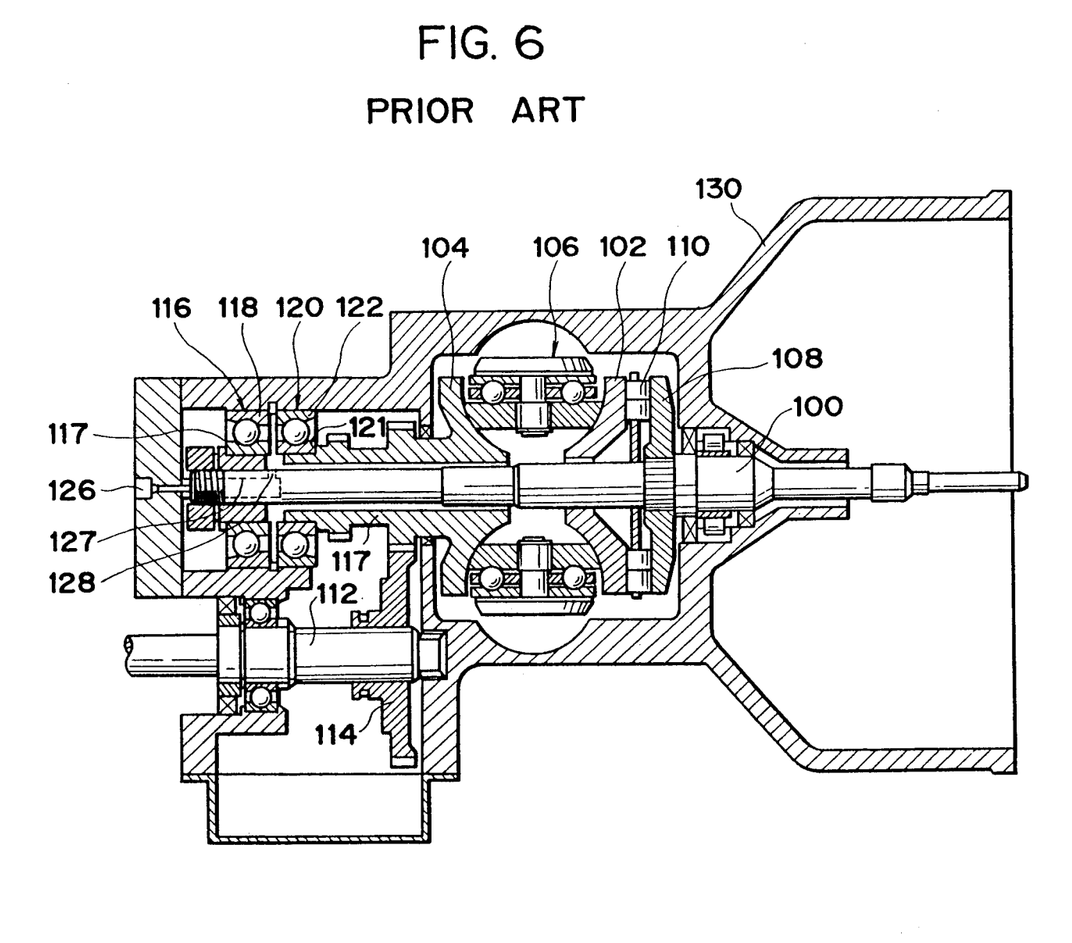
FIG. 6 is a cross-sectional view of an example of conventional art.

As a conventional example, FIG. 6 illustrates a continuously variable speed transmission mechanism disclosed in the Japanese Utility Model Laid-open Application No. 63-30656.

Referring to FIG. 6, on a shaft 100 there are rotatably mounted an input disk 102 and an output disk 104, between which provided are power rollers 106. By the function of loading rollers 110 based on the rotation of a loading cam 108, the input disk 102 is pressed to the power rollers 106, whereby the rotating power of the input disk is transmitted through the power rollers 106 to the output disk 104. Said power is transmitted to a gear 114 fixed on an output shaft 112 positioned parallel to the input shaft 100, and is taken out from said output shaft 112.

The reactive force to the right, applied to the input disk 102 at the power transmission, is transmitted through the loading rollers 110, loading cam 108 and input shaft 100 and is received by an inner ring 117 of a bearing 116 supporting said input shaft 100. On the other hand, the reactive force to the left, applied to the output disk 104, is transmitted by an extension 117 thereof and is received by an inner ring 121 of a bearing 120. As the above-mentioned bearings are in mutual contact across a stop ring therebetween, said reactive forces are received and are not transmitted to the outside. However, since the output power is finally taken out from the output shaft 112 provided parallel to the input shaft 100, there is required two shafts which increases not only the entire dimension of the transmission but also the weight and manufacturing cost thereof. The drawback in such conventional technology originates from a fact that the input shaft 100 extends through the tubular extension 117 of the output disk 104 (with the input shaft inside and the output shaft outside), so that the output power cannot be obtained directly from such outside shaft but has to be obtained from the output shaft 112 through the gear 112.

Also in the conventional continuously variable speed transmission mechanism shown in FIG. 6, a housing 130 is provided, in a portion close to the left-hand end of the shaft 100, with an oil path 126 communicating with a lubricating oil supply device (not shown). Also at the left-hand end of the shaft 100 and corresponding to the oil path 126, there is provided an axially extending oil supply path 127, and an oil supply path 128 is so formed as to connect the internal end of the oil supply path 127 and the external periphery of the shaft 100. Said oil supply path 128 is positioned in a space defined between the bearings 116 and 120.

The bearing 116 supporting the shaft 100 and the bearing 120 supporting the output disk 104 are lubricated by the lubricating oil supplied from said oil path 126. The revolutions of the shaft 100 and the output disk 104 are respectively equal to those of the inner ring of the bearing 116 and that of the bearing 120. As the oil supply path 126 is formed on the shaft 100, the lubricating oil is tangentially discharged with the speed of the shaft 100, namely that of the inner ring of the bearing 116. Consequently, said lubricating oil does not generate resistance to the rotation of the bearing 116. On the other hand, since the output disk 104 rotates with a different speed from that of the shaft 100 except the case of a speed transmission ratio of 1 : 1, the lubricating oil discharged from the oil supply path 128 generates a resistance (agitating resistance) to the rotation of the bearing 120, corresponding to the speed difference. Such resistance is one of the causes deteriorating the efficiency of the transmission. Furthermore, the bearings 116 and 120 are positioned along the axial direction, thus extending the axial dimension. Such axially extended dimension has posed a problem in the installation of such continuously variable speed transmission mechanism.

SUMMARY OF THE INVENTION

An object of the present invention is to provide an improved continuously variable speed transmission mechanism in which the input and output shafts can be positioned coaxially, and the reactive forces applied to the input and output disks at the power transmission can be received by a common thrust bearing.

Another object of the present invention is to provide a toroidal continuously variable speed transmission mechanism allowing to improve the efficiency of power transmission and to reduce the longitudinal dimension.

According to the present invention, a tubular input shaft and an output shaft are positioned coaxially, and a thrust bearing is provided therebetween. The reactive forces applied to the input disk and the output disks at the power transmitting state are respectively received by the inner and outer rings of said thrust bearing, through the input and output shafts.

The toroidal continuously variable speed transmission mechanism of the present invention comprises, a housing, an input disk, an output disk, roller means maintained in contact with said input and output disks and adapted to rotate thereby transmitting power from one of said input and output disks to the other, a shaft member connected to either of said input and output disks for transmitting power, a tubular member provided so as to include said shaft member therein and connected to the other of said input and output disks, for transmitting power, a shaft member bearing provided between said tubular member and said shaft member and rotatably supporting said shaft member with respect to said tubular member, a tubular member bearing provided between said housing and said tubular member and rotatably supporting said tubular member with respect to said housing, and pressurizing means for supplying, under pressure, lubricating oil for lubricating said shaft member bearing.

Wherein said pressurizing means includes a pressurizing unit for pressurized supply of lubricating oil and an oil supply path connected to said pressurizing unit and adapted to feed the lubricating oil, supplied under pressure, to the bearing, said oil supply path being adapted to integrally rotate with said tubular member.

Since said shaft member bearing is positioned between said tubular member and said shaft member while said tubular member bearing is positioned between said housing and said tubular member, the both bearings need not be arranged side by side in axial direction, and the axial dimension of the transmission can therefore be reduced. Also since said oil supply path rotates integrally with the tubular member, the lubricating oil supplied from said path does not constitute resistance to the rotation of said shaft member bearing.

DESCRIPTION OF THE PREFERRED EMBODIMENTS

Now the present invention will be clarified in detail by embodiments thereof applied to a toroidal continuously variable speed transmission mechanism, shown in the attached drawings.

Figure 1:
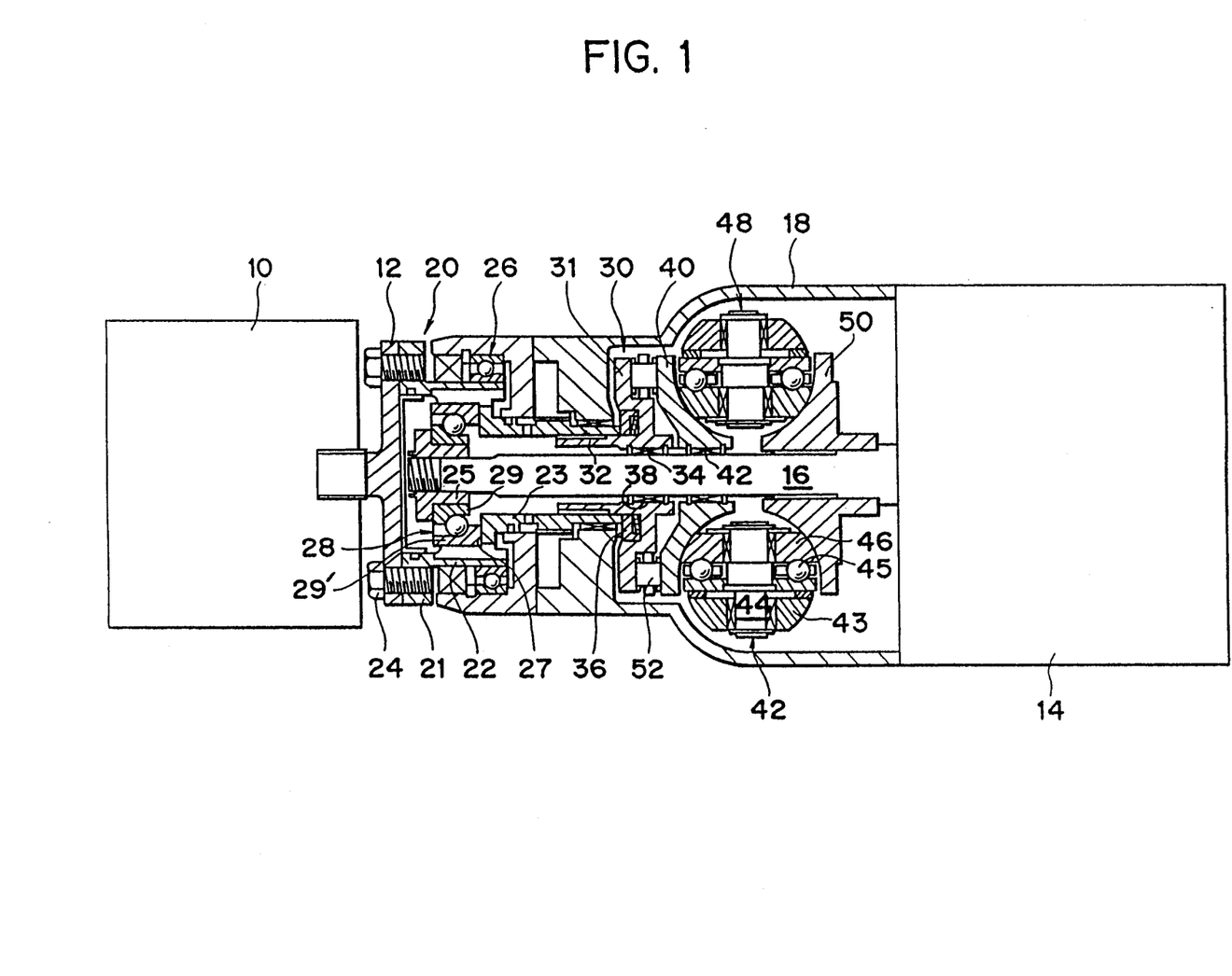
FIG. 1 is a partially cut-off elevation view of a first embodiment of the present invention.

Referring to FIG. 1, showing the cross section of a toroidal continuously variable speed transmission mechanism, an input unit 10 is provided with an input shaft consisting of a disk member 12 and an annular member 20, while an output unit 14 is provided with an output shaft 16 coaxially with said input shaft, and a housing 18 around said output shaft 16.

In the input side, the disk member 12 is connected to the input unit 10 by spline fitting, and the annular member 20 is positioned adjacent thereto. Said annular member 20 consists of a flange part 21, a larger cylindrical part 22 and a smaller cylindrical part 23. The disk member 12 and the annular member 20 are integrally combined by bolts 24 which pass through the disk member 12 and screwed into the flange part 21 of the annular member 20.

A bearing 26 is provided between the larger cylindrical part 22 and the housing 18, while another bearing 28 is provided between the smaller cylindrical part 23 and the output shaft. Said bearing 28 is an angular (thrust) bearing positioned between a pre-pressurizing nut 25 screwed on the free end of the output shaft 16 and the larger cylindrical part 22 and the smaller cylindrical part 23 of the annular member 20, wherein an inner ring 29 and an outer ring 29' respectively impinge on the end faces of the pre-pressurizing nut 25 and of the smaller cylindrical part 23. The input shaft, consisting of the disk member 12 and the annular member 20, is supported by the radial bearing 26 and can rotate with respect to the housing 18. Also the input shaft 12, 20 and the output shaft 16 can mutually rotate across the thrust bearing 28.

A pressure member 30, positioned adjacent to the smaller cylindrical part 23 of the annular member 20, consists of a flange part 31 and a cylindrical part 32. A bearing 34 is provided between the pressure member 30 and the output shaft 16, while a spacer 36 is provided between the pressure member 30 and the annular member 20. The pressure member 30 is biased by a spring 38 to the right in FIG. 1.

In a base portion of the output shaft 16, there are provided an input disk 40 and an output disk 50 in mutually opposed relationship. The input disk 40 is supported by a bearing 42 provided on the output shaft 16 and can rotate about said output shaft 16. On the other hand, the output disk 50 is fitted with the output shaft 16 by serration and rotates therewith.

The input disk 40 and the output disk 50 are respectively provided with toroidal cam faces on the mutually opposed surface, and two power roller assemblies 42 are provided in a space defined by said cam faces. Each of the power roller assemblies 42 consists of a trunnion 43, a shaft 44, a bearing 45 and a roller unit 46. The trunnion 43 supports the shaft 44 and is supported with respect to the housing 18 by a support structure (not shown). The roller unit 46 is supported on the trunnion 43 by the bearing 45, and is rendered rotatable about the shaft 44.

The support structure for the trunnion 43 is adapted to rock the power roller assemblies 42 about axes perpendicular to the plane of FIG. 1, clockwise and anticlockwise respectively, by a same amount. By said rotation of the power roller assemblies 42, the effective radii of the contact positions of the input disk 40 and the output disk 50 with said roller unit 46 vary in such a manner that one of said radii increases while the other decreases.

Between said pressure member 30 and the input disk 40, there are provided cam rollers 52. Said cam roller 52 is maintained in contact with the pressure member 30 and the input disk 40, and varies its longitudinal dimension by mutual rotation of the two, thereby pressing the input disk 40 against the power roller assemblies 42.

In the following there will be explained the function of the above-explained embodiment.

When the input shaft consisting of the disk member 12 and the annular member 20 is rotated by the driving force from the input unit 10, the pressure member 30 rotates integrally therewith. As a result, mutual rotation is generated between said pressure member 30 and the input disk 40, whereby the input disk 40 is pressed to the roller units 46 by the function of the loading cam 52 and the rotation is transmitted to the output disk 50 through said roller units 46.

In a state shown in FIG. 1, the effective radius of the input disk 40 is approximately equal to that of the output disk 50 (speed varying ratio about 1 : 1), so that the output disk 50 rotates with a speed same as that of the input disk 40. When the upper and lower power roller assemblies are respectively rotated anticlockwise and clockwise from the state shown in FIG. 1, the effective radius becomes smaller on the input disk 40 and larger on the output disk 50, so that the speed varying ratio varies continuously toward the speed reducing side. With the output disk 50, the output shaft 16 rotates integrally therewith, whereby the transmitted power is taken out in the output unit 14.

In the following there will be explained reactive forces applied to the input disk 40 and the output disk 50 at the power transmitting state.

When the input disk 40 is pressed by the loading cam 52 to the roller units 46, the input disk receives, from the roller units 46, a reactive force directed to the left in FIG. 1, and said reactive force is transmitted through the loading cam 52, pressure member 30 and smaller cylindrical part 23 of the annular member 20 and is received by the outer ring 31 of the thrust bearing 28. On the other hand, the output disk 50 receives, from the roller units 46, a reactive force directed to the right in FIG. 1, which is transmitted through the output shaft 16 and the pre-pressurizing nut 25 and is received by the inner ring 29 of the thrust bearing 28.

Thus, the reactive forces acting on the input disk 40 and the output disk 50 are both applied to the thrust bearing 28, and do not affect the housing 18. This is realized because the input shaft 12, 20 and the output shaft 16 are positioned coaxially by inserting an end portion of the output shaft 16 into the tubular structure of said input shaft, and because the output power can be directly obtained from the output shaft 16 owing to the above-mentioned structure.

In the following there will be explained another embodiment of the present invention.

Figure 2:
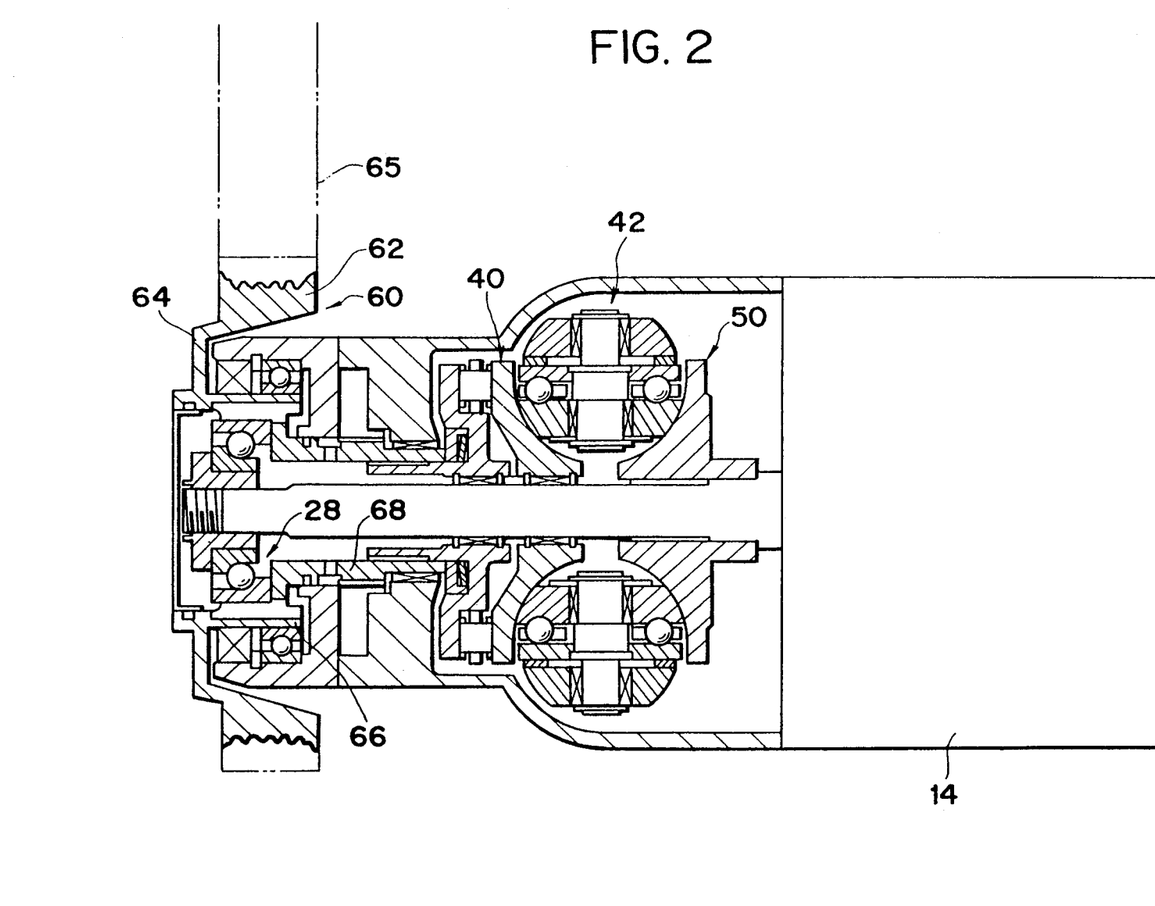
FIG. 2 is a partially cut-off elevation view of a second embodiment of the present invention.

A second embodiment shown in FIG. 2 is different from the above-explained 1st embodiment in that the annular member 20 is replaced by a pulley 60, consisting of a grooved part 62 on which a belt 65 is applied, a flange part 64, a larger cylindrical part 66 and a smaller cylindrical part 68. Other structures of the present embodiment are same as those in the first embodiment.

In the present embodiment, since the driving force is directly supplied by the pulley 60, the disk member 12 etc. in the first embodiment can be dispensed with. Like the pulley 60 on the input shaft, there may be employed a similar pulley on the output shaft.

Figure 3:
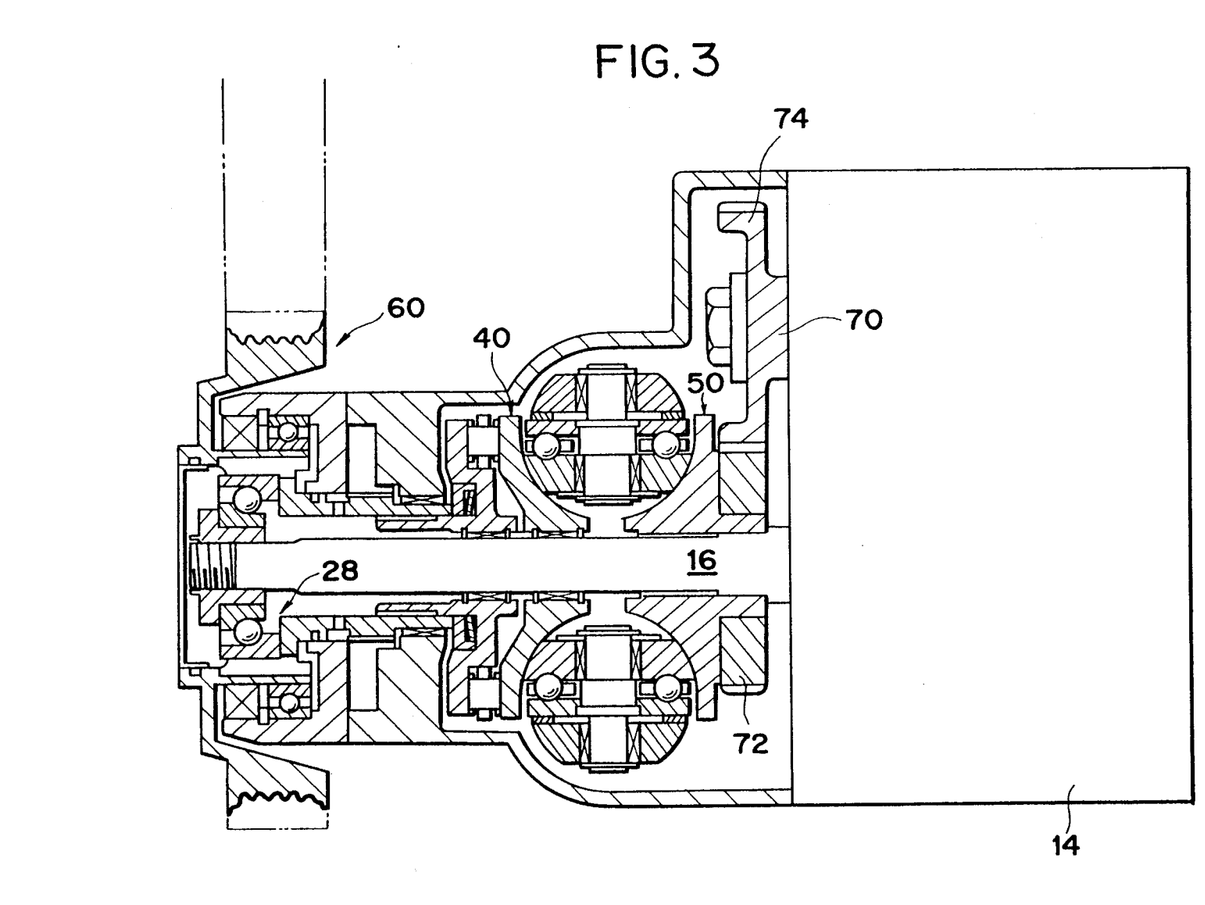
FIG. 3 is a partially cut-off elevation view of a third embodiment of the present invention.

FIG. 3 shows a third embodiment, which is different from the second embodiment in that the output power is obtained from two output shafts 16, 70. For this purpose, a gear 72 mounted on the output disk 50 integrally combined with the first output shaft 16 meshes with a gear 74 mounted on the second output shaft 70.

In the following there will be explained an embodiment in which the relationship of the input and output shafts is inverse to that in the first embodiment.

Figure 4:
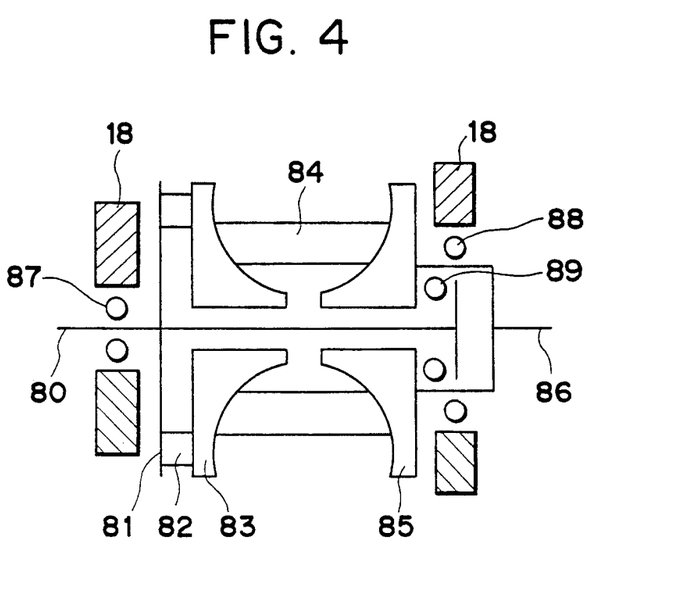
FIG. 4 is a schematic view of a fourth embodiment of the present invention.

In a fourth embodiment shown in FIG. 4, an input disk 83 and an output disk 85 are rotatably mounted on an input shaft 80. An end of the input shaft 80 is rotatably supported by a radial bearing 87 mounted on the housing 18, while the other end is rotatably supported by a thrust bearing 89 to be explained later. The output disk 85 is integrally combined with a tubular output shaft 86, which is rotatably supported by a radial bearing 88 mounted on the housing 18. The other end of said input shaft 80 extends into the hollow portion of said tubular output shaft 86, and said thrust bearing 89 is provided between the end face of said input shaft 80 and the end face of the output disk 85.

The driving force supplied from the input shaft 80 is transmitted, by means of a loading cam 81 and rollers 82, to the input disk 83, then transmitted through power rollers 84 to the output disk 85, and is further transmitted to the output unit through the output shaft 86 integral with the output disk 85. In this operation, the reactive force to the left, applied to the input disk 83, is transmitted through the rollers 82, cam 81 and input shaft 80, and is received by the thrust bearing 89, while the reactive force to the right, applied to the output disk 85 is also received by said thrust bearing 89.

Figure 5:
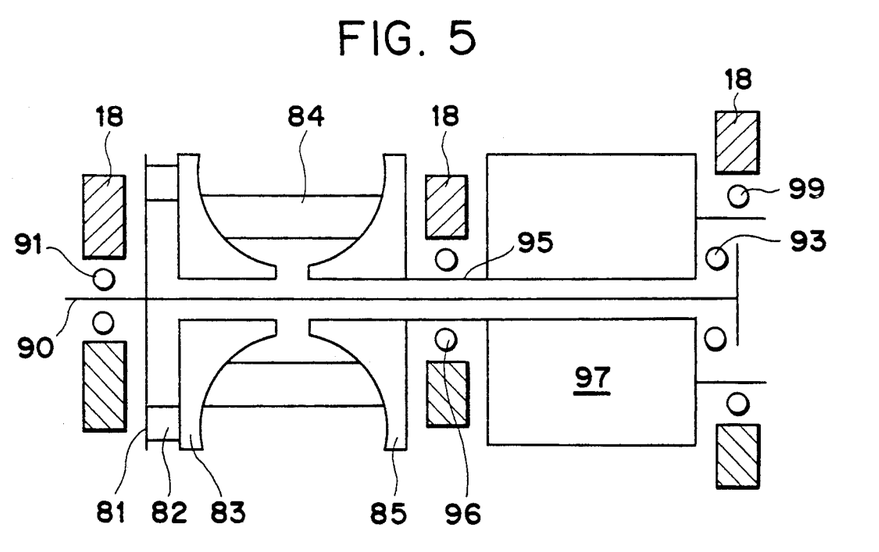
FIG. 5 is a schematic view of a fifth embodiment of the present invention.

A fifth embodiment shown in FIG. 5 is different, in the structure of the output side, from the aboveexplained fourth embodiment. The output disk 85 is integrally combined, at a connecting part 95, with a tubular output shaft 97, and said connecting part and output shaft are respectively supported, with respect to the housing 18, by radial bearings 96, 99. An input shaft 90 extends through the connecting part 95 and the output shaft 97, and a thrust bearing 93 is provided between the end face of said input shaft and the end face of the output shaft 97.

The reactive force to the left, applied to the input disk 83, is transmitted through the rollers 82, cam 81 and input shaft 80, and is received by the thrust bearing 93, as in the fourth embodiment, and the reactive force to the right, applied to the output disk 85, is transmitted through the connecting part 95 and the output shaft 97 and is received by the thrust bearing 93.

The present invention is naturally not limited to the foregoing embodiments but is subject to modifications or variations within the scope of the present invention.

According to the present invention, as explained in the foregoing, the input shaft receiving the reactive force from the input disk at the power transmitting state and the output shaft receiving the reactive force from the output disk are positioned coaxially and are in a mutually fitting relationship in a part thereof in the axial direction, and a thrust bearing is provided between the end portion of the input shaft and a corresponding portion of the output shaft, or between the end portion of the output shaft and a corresponding portion of the input shaft. Consequently, in the power transmitting state, the reactive forces applied to both disks are received by said thrust bearing. It is also possible to compactize the entire continuously variable speed transmission mechanism, and to reduce the number of components and the manufacturing cost thereof.

In the following there will be explained still other embodiments of the present invention, with reference to the attached drawings.

Figure 7:
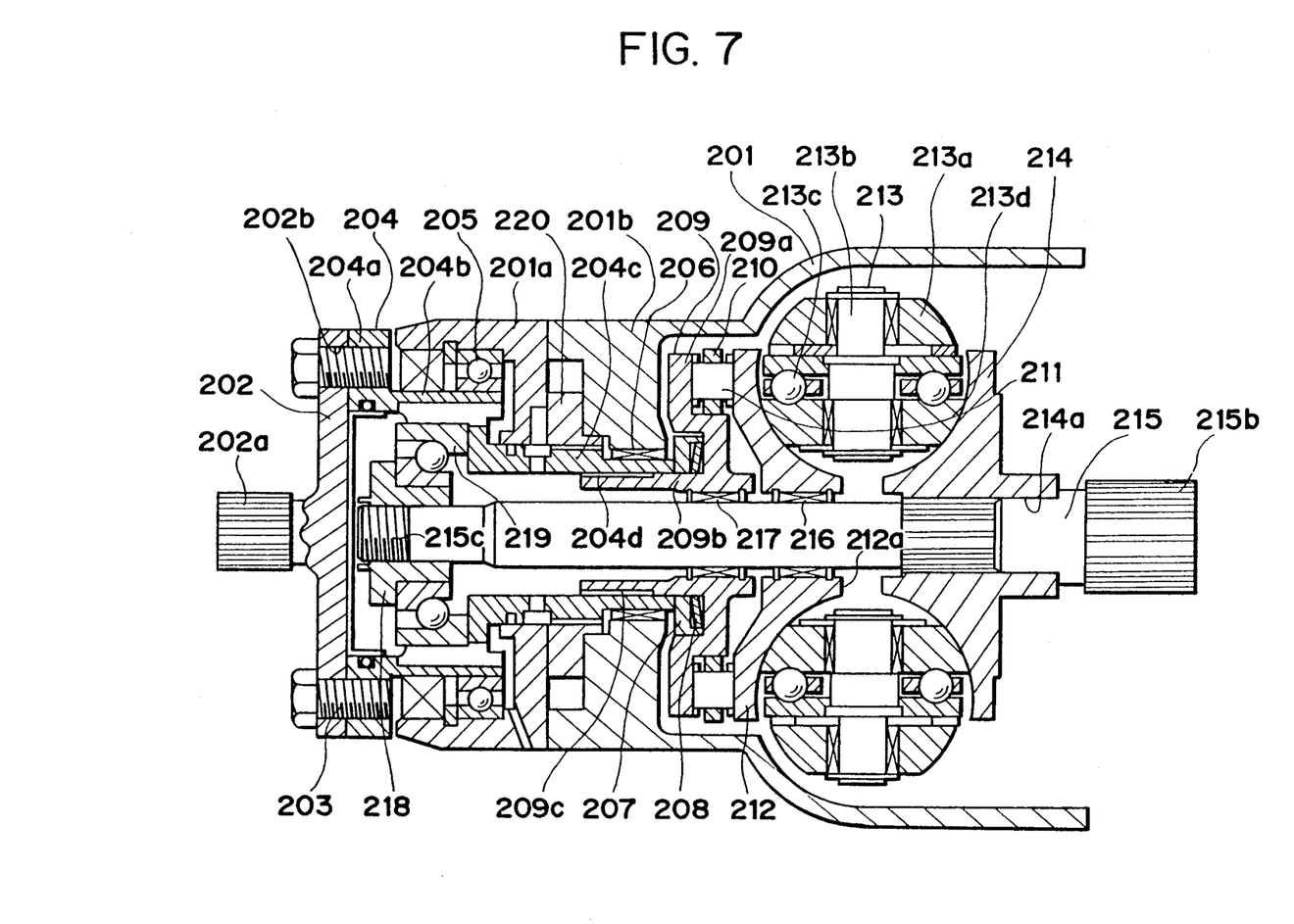
FIG. 7 is a partial cross-sectional view of a toroidal continuously variable speed transmission mechanism of the present invention.

FIG. 7 is a partial cross-sectional view of a toroidal continuously variable speed transmission mechanism of the present invention, wherein the left-hand side of a housing 201 constitutes the input side, and the right-hand side constitutes the output side. The housing 201 consists of a left half portion 201a and a right half portion 201b. The structure of the toroidal continuously variable speed transmission mechanism of the present invention will be explained, starting from the input side thereof. A disk member 202, provided with a spline 202a at the center thereof, is connected by said spline 202a to a power source (not shown). The disk member 202 is provided, along the external periphery thereof, with several bolt holes 202b distanced equally. Adjacent to and coaxially with said disk member 202, there is provided a tubular member 204, which consists of axially serial connection of a flange part 204a, a larger cylindrical part 204b and a smaller cylindrical part 204c. Said flange part 204a is provided with several female screws in positions corresponding to the bolt holes 202b of the disk member 202, and the disk member 202 and the tubular member 204 are mutually fixed by bolts 203.

The external periphery of the larger cylindrical part 204b of the tubular member 204 is rotatably supported, with respect to the housing 201, by a tubular member bearing 205, while the external periphery of the smaller cylindrical part 204c of the tubular member 204 is rotatably supported, with respect to the housing 201, by a bearing 206. On the internal periphery of the smaller cylindrical part 204c, there is formed a splined part 204d. Adjacent to the smaller cylindrical part 204c, there is provided a pressure member 209 consisting of a coaxial combination of a disk 209a and a tube 209b. On the external periphery of the tube 209c there is formed a splined part 209c, which engages with the splined part 204d of the tubular member 204, whereby the tubular member 204 and the pressure member 209 are so combined that they can axially displace each other but can transmit the rotating force therebetween. Between the pressure member 209 and the free end of the smaller cylindrical part 204c of the tubular member 204, there are provided a spacer 207 and a disk-shaped spring 208 for axially biasing the pressure member 209 and the tubular member 204 in mutually separating directions.

Said pressure member 209 is positioned next to an input disk 212, across loading rollers 211 supported by a retainer 210. Said input disk 212 has a substantially conical form with a toroidal external face, and also has an axial aperture 212a. The loading rollers 211 are in contact with the pressure member 209 and the input disk 212, and are adapted to press the input disk 212 to power roller assemblies 13 by the mutual rotation of the pressure member 209 and the input disk 212.

Opposed to the input disk 212, there is provided an output disk 214 having a same external face, and two power roller assemblies 213 are provided between the input disk 212 and the output disk 214. Each power roller assembly 213 consists of a trunnion 213a, a shaft 213b, a bearing 213c and a roller unit 213d. The trunnion 213a is supported, with respect to the housing 201, by a member (not shown), and supports the shaft 213b. The roller unit 213d is supported on the trunnion 213a by the bearing 213c, and is rendered rotatable about the shaft 213b. When in use, the roller unit 213d is in contact, across oil, with the input disk 212 and the output disk 214. The member supporting the trunnion 213a is adapted to rotate the power roller assemblies 213 about axes perpendicular to the plane of drawing, clockwise and anticlockwise respectively, by a same amount. Said rotation of the power roller assemblies varies the effective radii of contact positions of the input disk 212 and the output disk 214 with the roller unit 213d, in such a manner that one of said effective radii increases while the other decreases.

The output disk 214 is provided with an axially penetrating aperture 214a, in which a serrated part 214b is formed. A shaft member 125 extends through the aperture 214a of the output disk 214, aperture 212a of the input disk and tube 209b of the pressure member 209. The output disk 214 is normally pressed into the shaft member 215, but they may be serration coupled if necessary. The input disk 212 is supported by the shaft member 215 across a bearing 216, and the pressure member 209 is supported by the shaft member 215 across a bearing 217. Consequently, the input disk 211 and the pressure member 209 can rotate independently from the shaft member 215. On the left-hand end of the shaft member 215 there is formed a male screw 215a, on which is screwed is a pre-pressurizing nut 218. The external periphery of said nut 218 is supported, across a shaft member bearing 219, by the internal periphery of the larger cylindrical part 204b of the tubular member 204. Also at the right-hand end of the shaft member 215 there is formed a spline 215b, by which the shaft member 215 is connected to a power receiving unit (not shown).

Figure 8:
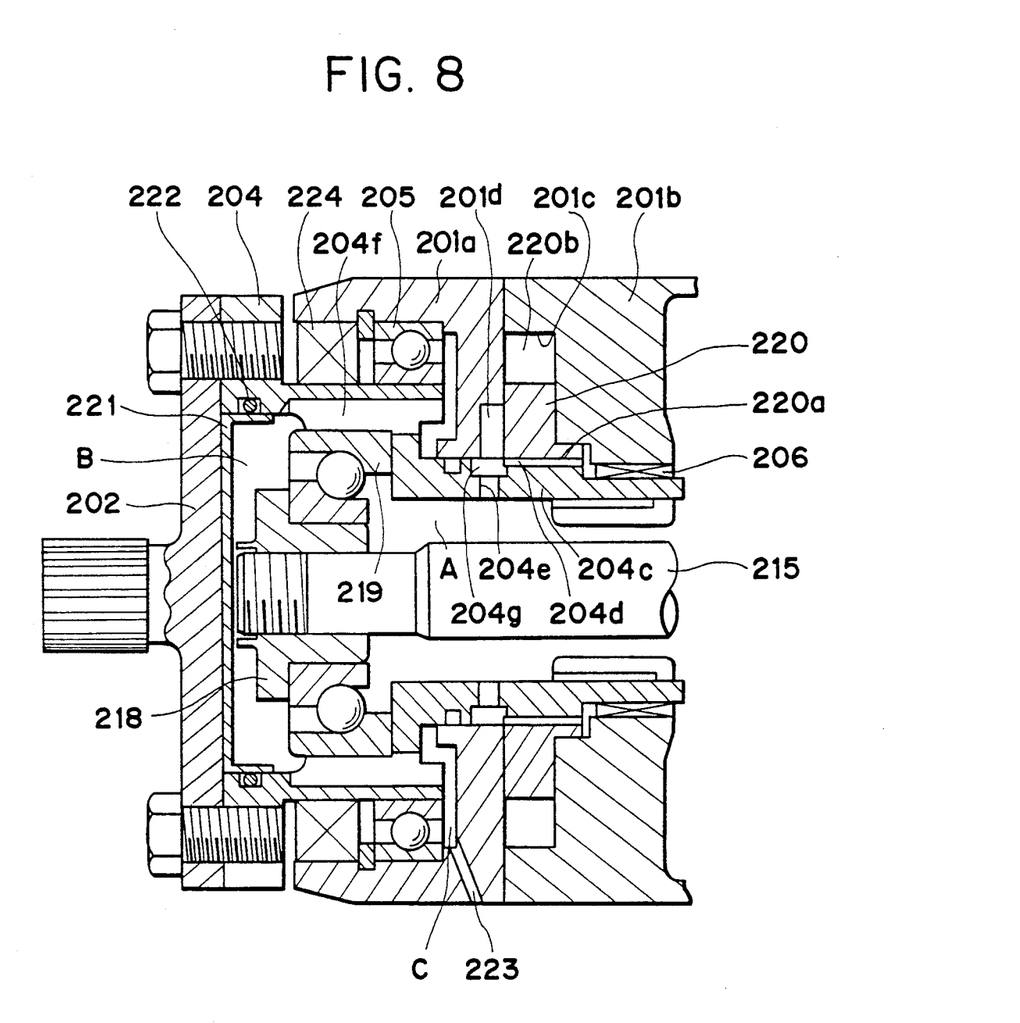
FIG. 8 is a magnified view of a left-hand portion of the embodiment shown in FIG. 7.

In the following explained is the bearing lubricating system employed in the toroidal continuously variable speed transmission mechanism of the present invention. FIG. 8 is a magnified view of the left-hand portion of the embodiment shown in FIG. 7. The smaller cylindrical part 204c of the tubular member 204 is provided, on the external periphery thereof, with a serrated part 204d, adjacent to a bearing 206. A rotary part 220 of a torocoid pump is provided in a cavity 201c, which is positioned radially outside smaller cylindrical part 204c and at the end of the right half portion 201b of the housing 201, and has an oval cross section when viewed in the axial direction. Said rotary part 220 is disk-shaped, with a serrated part 220a on the internal periphery engaging with a serrated part 204d of the tubular member 204, whereby said rotary part 220 rotates with the tubular member 204. The pump space is defined by the left half portion 201a of the housing 201 and the cavity 201c.

The housing 201 is provided with a lubricating oil supply part (not shown) in the right half portion 201b, and a lubricating oil discharge path 201d in the left half portion 201a. Said discharge path 201d communicates with a discharge path 204e provided radially in the smaller cylindrical part 204c. Though not illustrated, there are provided several discharge paths 204e at a constant pitch, and the discharge path 201d communicates, at the radially inward end thereof, with an annular groove 204g provided at the external periphery of the smaller cylindrical part 204c. Consequently the path 201d always communicates, at any position thereof, with the discharge path 204e. The paths 204e open in a space A defined between the tubular member 204 and the shaft member 215.

At a position outside the space A and across the shaft member bearing 219, there is defined a space B by the shaft member bearing 219, the tubular member 204 and the disk member 202. Adjacent to the disk member 202 there is provided a tubular member 221 closed at an end, which serves to prevent the oil leakage in cooperation with an O-ring 222 provided on the external periphery thereof. The space B communicates, through an axial oil discharge path 204f axially penetrating the larger cylindrical part 204b of the tubular member 204, with a space C defined by the left half portion 201a of the housing 201, the tubular member 204 and the tubular member bearing 205. Said space C communicates further, through an external discharge path 223, with an external tank (not shown). Adjacent to the tubular member bearing 205, there is provided a seal 224 for presenting the leakage of oil for lubricating the tubular member bearing 205.

In the following there will be explained the function of the toroidal continuously variable speed transmission mechanism of the present embodiment.

Referring to FIG. 7, rotary force is transmitted from a rotary part of an engine (not shown), through the spline 202a, to the tubular member 204. With the rotation of the tubular member 204, the pressure member 209 rotates integrally therewith, whereby the input disk 212 is rotated through the loading rollers 211. The rotation of the input disk 212 causes the rotation of the output disk 214, through the roller units 213d of the power roller assemblies 213. In a state shown in FIG. 7, the effective radii of the contact positions of the input disk 211 and the output disk 214 with the roller units 213d of the power roller assemblies 213 are approximately equal, so that the speed varying ratio is about 1 : 1. When the upper and lower power roller assemblies rotate anticlockwise and clockwise respectively from said state, the effective radius of the contact position of the input disk 212 with the power roller assemblies 213 decreases while that of the output disk 214 with the power roller assemblies 213 increases, so that the speed varying ratio continuously varies to the speed reducing side. Naturally the speed varying ratio continuously varies to the speed increasing side when the power roller assemblies respectively rotate in the opposite directions. The rotation of the output disk 214 causes the shaft member 215 to rotate, whereby the rotary force is transmitted, through the spline 215b, to a power receiving unit (not shown).

Referring to FIG. 8, the rotation of the tubular member 204 causes the rotary part 220 of the torocoid pump to rotate, whereby the lubricating oil is fed under pressure from an oil supply path (not shown) to the discharge path 201d. The fed lubricating oil is discharged to the space A through the discharge path 204e (serving as an oil supply path for the shaft member bearing 219). Since the path 204e rotates integrally with the tubular member 204, the lubricating oil is discharged from the path 204e with a circumferential speed substantially same as the speed of the tubular member 204. Said lubricating oil travels along the internal wall of the tubular member and lubricates the shaft member bearing 219. As the outer ring of said bearing 219 rotates integrally with the tubular member 204, it comes into contact with the lubricating oil, at a speed close to that of said lubricating oil, so that the agitating resistance of the bearing 219 becomes very low.

The lubricating oil, lubricating the shaft member bearing 219 and passing therethrough, enters the space B, and then the space C through the axial oil discharge path 204f of the tubular member 204. Thereafter the lubricating oil returns to an external tank (not shown), through the external discharge path 223.

The present invention is naturally not limited to the embodiments explained above, but is subjected to variations and modifications within the scope and spirit of the appended claims. For example, the pump employed for feeding the lubricating oil is not limited to torocoid pump, but may be composed of a vane pump or a gear pump.

As explained in the foregoing, in the toroidal continuously variable speed transmission mechanism of the present invention, the shaft member bearing is provided between the tubular member and the shaft member, while the tubular member bearing is provided between the housing and the tubular member, so that both bearings need not be positioned side by side in the axial direction. The longitudinal dimension of the transmission can therefore be reduced.

Also the oil supply path for said bearings rotates integrally with the tubular member, so that the lubricating oil supplied from said path does not constitute resistance to the rotation of the shaft member bearing.

What is claimed is:

1. A continuously variable speed transmission mechanism comprising:
    a tubular input shaft connected at an end thereof to an input unit;
    an output shaft positioned coaxially with said input shaft, said output shaft being connected at an end thereof to an output unit and extending at the other end into the hollow part of said input shaft;
    an input disk rotatably mounted on said output shaft and adapted to rotate by the driving force from said input shaft;
    an output disk fixed on said output shaft and adapted to rotate by the driving force transmitted from said input disk through power rollers, thereby transmitting said driving force to said output shaft; and
    a thrust bearing provided between the other end of said output shaft and a corresponding part of said input shaft, thereby enabling mutual rotation of said shafts;
    wherein the reactive force applied to said input disk at the transmission of driving force is received by said thrust bearing through said input shaft, while the reactive force applied to said output disk is also received by said thrust bearing through said output shaft.

2. A continuously variable speed transmission mechanism comprising:
    a tubular output shaft connected at an end thereof to an output unit;
    an input shaft positioned coaxially with said output shaft, said input shaft being connected at an end thereof to an input unit and extending at the other end into the hollow part of said output shaft;
    an input disk rotatably mounted on said input shaft and adapted to rotate by the driving force from said input shaft;
    an output disk rotatably mounted on said input shaft, adapted to receive the rotation from said input disk through power rollers, and integrally connected to said output shaft; and
    a thrust bearing provided between the other end of said output shaft and a corresponding part of said input shaft;
    wherein the reactive force applied to said input disk at the transmission of driving force is received by said thrust bearing through said input shaft, while the reactive force applied to said output disk is also received by said thrust bearing through said output shaft.

3. A toroidal continuously variable speed transmission mechanism comprising:
    a housing;
    an input disk;
    an output disk;
    roller means adapted to rotate in contact with said input and output disks thereby transmitting power from either of said input and output disks to the other;
    a shaft member connected to either of said input and output disks thereby transmitting power;
    a tubular member provided so as to include said shaft member and connected to the other of said input and output disks thereby transmitting power;
    a bearing for said shaft member provided between said tubular member and said shaft member and adapted to support said shaft member in rotatable manner with respect to said tubular member;

a bearing for said tubular member provided between said housing and said tubular member and adapted to support said tubular member in rotatable manner with respect to said housing; and pressure supply means for supplying, under pressure, lubricating oil for lubricating said shaft member bearing;

wherein said pressure supply means includes a pressure supply unit for supplying the lubricating oil under pressure, and an oil supply path connected to said pressure supply unit and adapted to supply thus supplied lubricating oil to the bearings, said oil supply path being adapted to rotate integrally with said tubular member.

* * * * *